(12) United States Patent
Choi et al.

(10) Patent No.: US 12,330,961 B2
(45) Date of Patent: Jun. 17, 2025

(54) SELF-REGENERABLE FIBROUS ADSORBENT FOR HEAVY METAL ADSORPTION

(71) Applicant: KOREA INSTITUTE OF SCIENCE AND TECHNOLOGY, Seoul (KR)

(72) Inventors: Jae Woo Choi, Seoul (KR); Kyung-Won Jung, Seoul (KR); Youngkyun Jung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 429 days.

(21) Appl. No.: 18/064,736

(22) Filed: Dec. 12, 2022

(65) Prior Publication Data

US 2023/0339782 A1    Oct. 26, 2023

(30) Foreign Application Priority Data

Apr. 20, 2022   (KR) .......................... 10-2022-0048686

(51) Int. Cl.
*C02F 1/28* (2023.01)
*C02F 1/62* (2023.01)
*C02F 101/20* (2006.01)

(52) U.S. Cl.
CPC ............... *C02F 1/285* (2013.01); *C02F 1/62* (2013.01); *C02F 2101/20* (2013.01)

(58) Field of Classification Search
None
See application file for complete search history.

(56) References Cited

U.S. PATENT DOCUMENTS

| 5,378,802 | A | 1/1995 | Honda |
| 7,741,424 | B2 | 6/2010 | Lu |
| 8,147,702 | B2 | 4/2012 | Al-Jlil |
| 8,216,966 | B2 | 7/2012 | Al-Jlil |
| 2003/0149122 | A1* | 8/2003 | Bureau ................ B01J 20/3425 |
| | | | 521/26 |

(Continued)

FOREIGN PATENT DOCUMENTS

| JP | 5929290 B2 | 6/2016 |
| KR | 10-0412203 B1 | 12/2003 |
| KR | 10-2008-0093771 A | 10/2008 |

(Continued)

OTHER PUBLICATIONS

Ahmad M. Shoushtari et al., "Preparation and Characterization of High Efficiency Ion-Exchange Crosslinked Acrylic Fibers," Journal of Applied Polymer Science, 2006, vol. 101, pp. 2202-2209.

(Continued)

*Primary Examiner* — Chester T Barry

(57) ABSTRACT

The present disclosure relates to a self-regenerable fibrous adsorbent for heavy metal adsorption, which is capable of adsorbing heavy metal ions in water, growing them into crystals and desorbing the grown heavy metal crystals on its own, and a method for preparing the same. The self-regenerable fibrous adsorbent for heavy metal adsorption according to the present disclosure is a fibrous polymer consisting of PAN and PMMA, wherein amine functional groups are immobilized on the surface of the PAN and hydroxyl groups (—OH) are immobilized on the surface of the PMMA.

11 Claims, 16 Drawing Sheets

(56) References Cited

U.S. PATENT DOCUMENTS

2018/0100065 A1* 4/2018 Gray .............. C07F 7/0812
2022/0347654 A1* 11/2022 Gray .............. B01D 53/62

FOREIGN PATENT DOCUMENTS

| KR | 10-1776370 B1 | 9/2017 |
| KR | 10-1801294 B1 | 11/2017 |
| KR | 10-1816008 B1 | 1/2018 |
| KR | 10-1831699 B1 | 2/2018 |

OTHER PUBLICATIONS

Myoung Jun Park et al., "Recyclable composite nanofiber adsorbent for Li+ recovery from seawater desalination retentate," Chemical Engineering Journal, 2014, vol. 254, pp. 73-81.

Guoping Xiao et al., "Adsorption and Desorption Behavior of Lithium Ion in Spherical PVC-MnO2 Ion Sieve," Industrial & Engineering Chemistry Research, 2012, vol. 51, pp. 10921-10929.

Youngkyun Jung et al., "Nanofibrous spherical cage mimicking a ball of pearl necklaces for super capture of heavy metal ions," Journal of Materials Chemistry A, 2021, vol. 9, pp. 17281-17291.

Youngkyun Jung et al., "Core/shell hybrid fiber with aminated PAN and Fe2O3 as a high-capacity adsorbent for phosphate ions," Journal of Hazardous Materials, 2019, vol. 378, No. 120726.

Xuefen Wang et al., "Poly(ethyleneimine) nanofibrous affinity membrane fabricated via one step wet-electrospinning from poly(vinyl alcohol)-doped poly(ethyleneimine) solution system and its application," Journal of Membrane Science, 2011, pp. 191-199, vol. 379.

Jianxin Zhang et al., "Tetraethylenepentamine-grafted polyacrylonitrile-poly(methyl methacrylate) hollow fibers for low concentration CO2 capture at ambient temperature," Process Safety and Environmental Protection, 2022, pp. 390-396, vol. 157.

\* cited by examiner

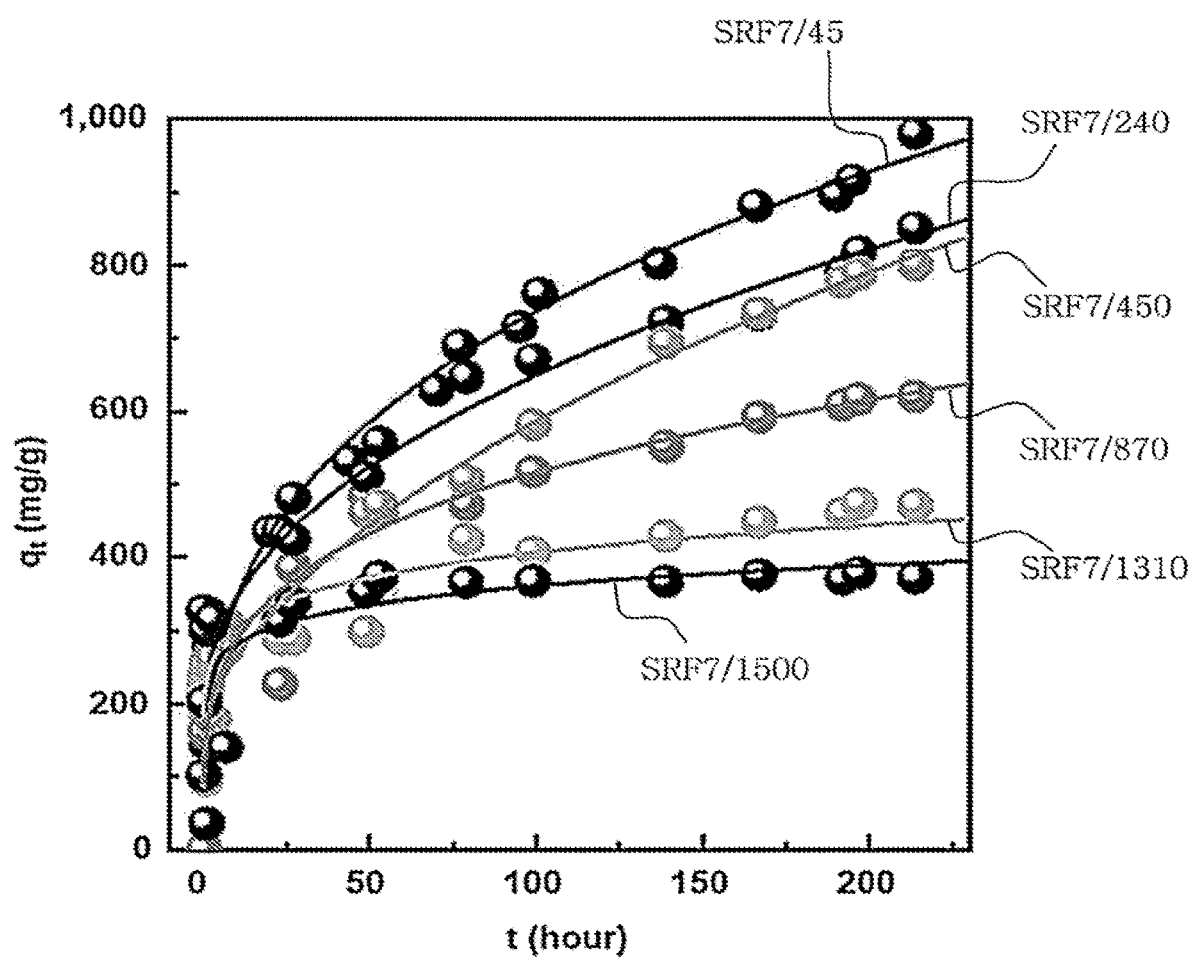

FIG. 8B

| Element | Wt% | At% |
|---|---|---|
| CK | 03.14 | 14.17 |
| NK | 00.30 | 01.16 |
| OK | 00.88 | 02.98 |
| CuK | 95.68 | 81.69 |
| Matrix | Correction | ZAF |

SELF-REGENERABLE FIBROUS ADSORBENT FOR HEAVY METAL ADSORPTION

CROSS-REFERENCE TO RELATED APPLICATION

This application claims priority to Korean Patent Application No. 10-2022-0048686, filed on Apr. 20, 2022, and all the benefits accruing therefrom under 35 U.S.C. § 119, the contents of which in its entirety are herein incorporated by reference.

BACKGROUND

1. Field

This invention was made with the support of the Ministry of Science and ICT under Project No. 1711154044, which was conducted under the research project entitled "Developing customized module to enhance applicability of reactive filter under extreme environment" within the project named "Nano-Material Technology Development (R & D)" under the management of the National Research Foundation of Korea, from Jan. 1, 2022 to Dec. 31, 2022.

The present disclosure relates to a self-regenerable fibrous adsorbent for heavy metal adsorption and a method for preparing the same, more particularly to a self-regenerable fibrous adsorbent for heavy metal adsorption, which is capable of adsorbing heavy metal ions in water, growing them into crystals and desorbing the grown heavy metal crystals on its own, and a method for preparing the same.

2. Description of the Related Art

Eco-friendly methods for purifying industrial wastewater generated in ironmaking, plating, semiconductor and electronics industries are becoming more and more important, and various methods have been developed to process up to tens of thousands of ppm of heavy metal ions contained in the industrial wastewater.

Among them, although the method of recovering the heavy metal ions by precipitating as oxides by adjusting the pH of the wastewater is advantageous in that 99% or more of heavy metals can be removed, it is limited in industrial application due to environmental regulations because a large quantity of chemical additives are used.

For this reason, researches are being conducted on materials that can be recycled repeatedly and exhibit superior heavy metal adsorption performance per unit weight. General high-functional adsorbents for water treatment have diameters of several nanometers to tens of micrometers to increase specific surface area. These powder-type adsorbents are not suitable for recovery of heavy metals. When the powder-type adsorbent with a small diameter is used by packing in a column, etc., there are problems that the pressure applied to the water to be treated is decreased and the adsorbent should be replaced frequently. And, if the column is not used, it is not easy to recover the adsorbent due to the small size. For these reasons, resins having various chemical functional groups (see U.S. Pat. No. 5,378, 802 and Korean Patent Registration No. 1816008) are used for adsorption of heavy metals, but the adsorption efficiency is not high.

Recently, fibrous adsorbents are used to remove heavy metal ions in water. Korean Patent Registration No. 1831699 discloses a technology of adsorbing heavy metals using oxy-PAN nanofibers obtained by oxidizing PAN nanofibers, Japanese Patent Registration No. 5929290 discloses a technology of recovering rare-earth metals in water using a metal complex containing one or more hydrophilic polymer of PAN and PMMA, and Japanese Patent Publication No. 2008-0093771 discloses a technology of adsorbing heavy metals using a polyacrylonitrile (PAN)/hydroxyapatite (HAp) composite adsorbent.

The applicant of the present disclosure has also presented a technology of adsorbing heavy metal cations and heavy metal anions in water in Korean Patent Registration No. 1801294 using an acryl-based fibrous adsorbent wherein a plurality of amine groups are immobilized.

However, the existing fibrous adsorbents including that of Korean Patent Registration No. 1801294 require a separate adsorbent regeneration process for reuse. That is to say, the fibrous adsorbent used for the adsorption of heavy metals should be recovered and subjected to a separate adsorbent regeneration process prior to re-introduction to a heavy metal adsorption process.

SUMMARY

The present disclosure is directed to providing a self-regenerable fibrous adsorbent for heavy metal adsorption, which is capable of adsorbing heavy metal ions in water, growing them into crystals and desorbing the grown heavy metal crystals on its own, and a method for preparing the same.

The present disclosure provides a self-regenerable fibrous adsorbent for heavy metal adsorption, which is a fibrous polymer consisting of a first polymer material and a second polymer material, wherein heavy metal-adsorbing functional groups are immobilized on the surface of the first polymer material and heavy metal crystal-desorbing functional groups are immobilized on the surface of the second polymer material, heavy metal ions in water are adsorbed by the heavy metal-adsorbing functional groups of the first polymer material and grow into crystals, and the heavy metal crystals are desorbed by the heavy metal crystal-desorbing functional groups of the second polymer material when they grow to a predetermined size or larger.

The heavy metal-adsorbing functional group is an amine functional group, and the heavy metal crystal-desorbing functional group is any of a hydroxyl group, a methyl group, a carbonyl group, a carboxyl group and a phosphate group.

The first polymer material is a material that can immobilize amine functional groups, and the second polymer material is a material that cannot adsorb heavy metal ions in water.

The first polymer material is any of polyisopropylacrylamide, polyaryleneamine, poly(glycidyl methacrylate) and polyacrylonitrile.

The second polymer material is any of polychloroprene, polyisoprene, polyisobutylene, polybutadiene, SBS rubber, polyamide, a natural polymer, an initial synthetic polymer, polypropylene, polyvinyl chloride, polyethylene, polystyrene, nylon, polyester and phenol resin.

The present disclosure also provides a self-regenerable fibrous adsorbent for heavy metal adsorption, which is a fibrous polymer consisting of PAN and PMMA, wherein amine functional groups are immobilized on the surface of the PAN and hydroxyl groups (—OH) are immobilized on the surface of the PMMA.

Heavy metal ions in water are adsorbed by the amine functional group of the PAN and grow into crystals, and the heavy metal crystals are desorbed by the hydroxyl groups (—OH) of the PMMA when they grow to a predetermined size or larger.

The amine functional groups are formed from substitution of the nitrile groups (—C≡N) of the PAN, and the hydroxyl groups (—OH) are formed from hydrolysis of the carbonyl groups (—C=O) of the PMMA.

The fibrous polymer contains 7 wt % or less of PMMA based on the total weight of the fibrous polymer. In addition, specifically, the fibrous polymer has a diameter of smaller than 1.5 mm.

The amine functional group is a functional group including an amine group (—NH$_2$) that can adsorb heavy metal ions.

The present disclosure also provides a method for preparing a self-regenerable fibrous adsorbent for heavy metal adsorption, which includes: a step of preparing a PAN-PMMA mixture solution wherein PAN and PMMA are dissolved; a step of preparing a fibrous polymer by spinning the PAN-PMMA mixture solution; and a step of immobilizing amine functional groups on the surface of the PAN of the fibrous polymer and immobilizing hydroxyl groups (—OH) on the surface of the PMMA of the fibrous polymer by reacting the fibrous polymer with an amine compound.

The nitrile groups (—C≡N) on the surface of the PAN are substituted with amine functional groups and the carbonyl groups (—C=O) on the surface of the PMMA are converted to hydroxyl groups (—OH) through hydrolysis by the reaction of the fibrous polymer and the amine compound.

Specifically, in the PAN-PMMA mixture solution, the PMMA is contained at 7 wt % or less based on the weight of the PAN and the PMMA. In addition, specifically, the fibrous polymer has a diameter of smaller than 1.5 mm.

The amine compound is an amine compound having a podand structure. Diethylenetriamine (DETA) may be used.

The amine compound may be any of ethylenediamine, tris(2-aminoethyl)amine, propane-1,3-diamine, methane triamine, 3-(2-aminoethyl)pentane-1,5-diamine, melamine, diaminofurazan, diaminopyridine and diaminopyrimidine or a combination thereof.

A nonmetallic Lewis acid catalyst or a metallic Lewis acid catalyst may be added during the reaction of the fibrous polymer and the amine compound.

The self-regenerable fibrous adsorbent for heavy metal adsorption and a method for preparing the same according to the present disclosure provide the following advantageous effect.

By using a fibrous polymer consisting of PAN and PMMA for removal of heavy metals in water, the heavy metal ions in water may be adsorbed by amine functional groups immobilized on the surface of the PAN, and heavy metal crystals grown from the heavy metal ions adsorbed by the amine functional groups are induced to desorb on their own by hydroxyl groups (—OH) on the surface of the PMMA. Therefore, a separate regeneration process is not required for the fibrous adsorbent. Accordingly, it is not necessary to recover the fibrous adsorbent from a reaction tank for regeneration of the fibrous adsorbent.

BRIEF DESCRIPTION OF THE DRAWINGS

FIG. 6 shows the copper adsorption characteristics of self-regenerable fibrous adsorbents having different diameters depending on time.

FIG. 8A to FIG. 8C show the SEM and EDS analysis results of a self-regenerable fibrous adsorbent at the site where copper crystals have been desorbed.

DETAILED DESCRIPTION

Figure 1:
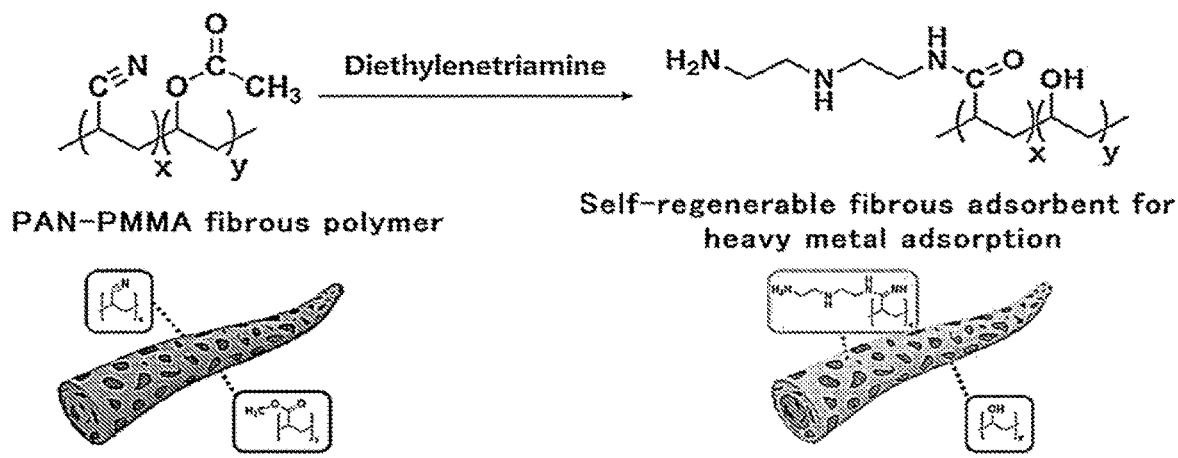
FIG. 1 shows a process whereby a self-regenerable fibrous adsorbent for heavy metal adsorption is prepared by reaction of a PAN-PMMA fibrous polymer and an amine compound.
Figure 2:
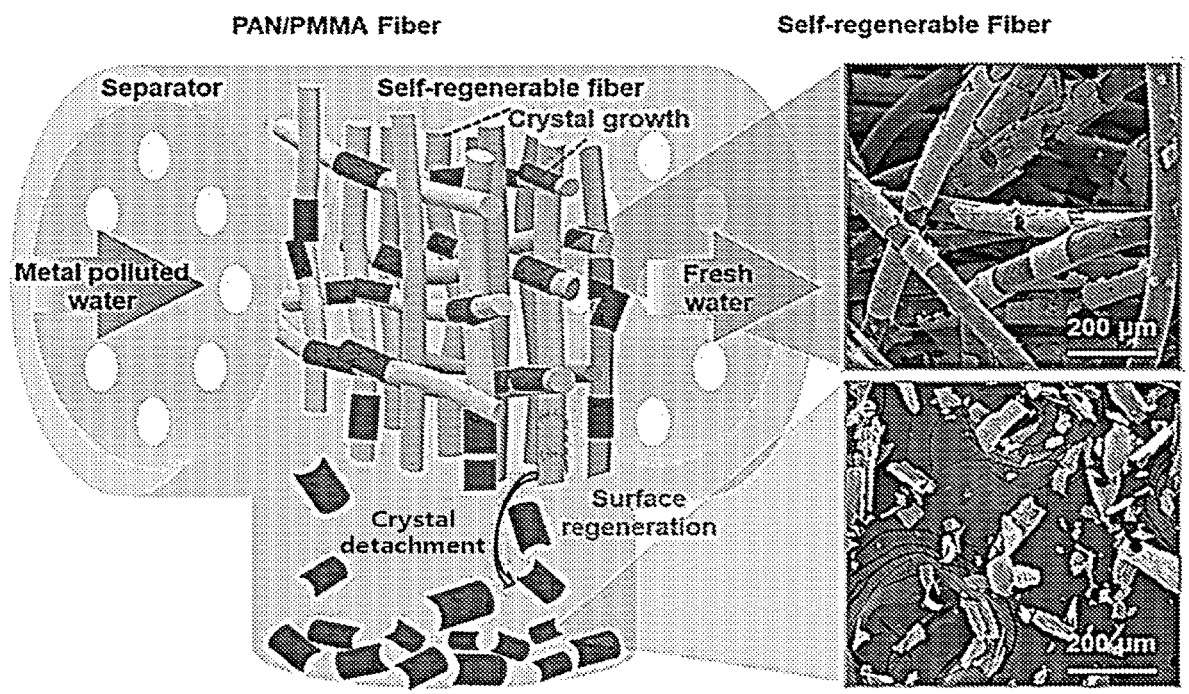
FIG. 2 shows a process whereby heavy metals are absorbed and heavy metal crystals are desorbed by a self-regenerable fibrous adsorbent for heavy metal adsorption according to the present disclosure.

The present disclosure presents a technology about a self-regenerable fibrous adsorbent for heavy metal adsorption.

As mentioned above in the 'Background' section, general adsorbents require a separate regeneration process of removing adsorbed heavy metals for reuse. It is because the adsorbents have adsorbing ability only.

The present disclosure presents a so-called self-regenerable fibrous adsorbent for heavy metal adsorption, which can not only adsorb heavy metals but also desorb the adsorbed heavy metals on its own.

The self-regenerable fibrous adsorbent for heavy metal adsorption according to the present disclosure is formed of a fibrous polymer having amine functional groups that can adsorb heavy metals on the surface of the fibrous polymer and hydroxyl groups (—OH) that desorb heavy metal crystals grown after being adsorbed to the amine functional groups.

The fibrous polymer that constitutes the self-regenerable fibrous adsorbent for heavy metal adsorption of the present disclosure is a composite polymer wherein PAN (polyacrylonitrile) and PMMA (poly(methyl methacrylate)) are mixed at a predetermined ratio. The amine functional groups are immobilized on the PAN and hydroxyl groups (—OH) are immobilized on the PMMA.

Since the fibrous polymer is a composite polymer wherein PAN and PMMA are mixed at a predetermined ratio, the amine functional groups and the hydroxyl groups (—OH) are immobilized on the surface of the fibrous polymer at a predetermined ratio.

In the present disclosure, the presence of hydroxyl groups (—OH) in addition to amine functional groups on the fibrous polymer and the control of the hydroxyl groups (—OH) in an optimal range are very important features.

If only the amine functional groups that can adsorb heavy metals are present on the surface of the fibrous polymer, there will be no difference from the general adsorbents having heavy metal-adsorbing ability only. However, the presence of the hydroxyl groups (—OH) immobilized on the surface of the fibrous polymer at a predetermined ratio, in addition to the amine functional groups, allows not only the adsorption of heavy metals but also the desorption of the adsorbed heavy metal crystals.

If only the amine functional groups are present throughout the surface of the fibrous polymer, the bonding of the amine functional groups to the adsorbed heavy metal ions is stabilized. On the other hand, if the amine functional groups are present on the surface of the fibrous polymer at a predetermined density and the hydroxyl groups (—OH) are present between the amine functional groups, the heavy metal ions adsorbed by the amine functional groups are oxidized and grow into heavy metal crystals with a predetermined size or larger because the hydroxyl groups (—OH) lack adsorption capacity for the heavy metal ions. Then, the heavy metal crystals are desorbed from the surface of the fibrous polymer naturally as the bonding to the amine functional groups is weakened.

Metaphorically, in a state where an adhesive (amine functional groups) is applied on a portion of the surface of the fibrous polymer and the remaining portion remains with no adhesive applied (hydroxyl groups are present), if the size of an adherent (heavy metal crystals) on the adhesive becomes equal to or larger than a predetermined size, the adherent (heavy metal crystals) will be detached from the fibrous polymer. On the contrary, if the adhesive (amine functional groups) is applied uniformly throughout the surface of the fibrous polymer, the possibility of desorption of the adherent (heavy metal crystals) from the adhesive (amine functional groups) is decreased since the bonding between the adherent (heavy metal crystals) and the adhesive (amine functional groups) is maintained stably.

The present disclosure embodies a fibrous adsorbent which allows not only the adsorption of heavy metals but also the self-desorption of heavy metals based on this principle.

The adsorption performance of the heavy metals and the desorption performance of the adsorbed heavy metals are determined by the proportions of the amine functional groups and the hydroxyl groups (—OH). Therefore, it is important to control the mixing ration of PAN and PMMA as an optimal ratio. This will be described in detail through experimental examples. For reference, because the hydroxyl groups (—OH) are immobilized on PMMA, the proportion of the hydroxyl groups (—OH) can be controlled with the mixing ratio of PMMA.

The immobilization of the amine functional groups and the hydroxyl groups (—OH) on PAN and PMMA, respectively, which constitute the fibrous polymer, is achieved by reacting the fibrous polymer consisting of PAN and PMMA with an amine compound.

If the fibrous polymer consisting of PAN and PMMA is reacted with an amine compound, the nitrile groups (—C≡N) on the surface of the PAN are substituted with amine functional groups and the carbonyl groups (—C=O) on the surface of the PMMA are converted to hydroxyl groups (—OH) by hydrolysis.

The amine compound that reacts with the fibrous polymer may be a primary or higher amine compound having an alkyl group, which can be bonded to the nitrile group of the PAN and act as a ligand. In an exemplary embodiment, any of ethylenediamine (EDA), diethylenetriamine (DETA), tris(2-aminoethyl)amine, propane-1,3-diamine, methane triamine, 3-(2-aminoethyl)pentane-1,5-diamine, melamine, diaminofurazan, diaminopyridine and diaminopyrimidine or a combination thereof may be used.

More specifically, an amine compound having a podand structure may be used. The amine compound having a podand structure is advantageous in that, due to a linear structure, the number of unit functional groups is small and thus the compound can be effectively introduced onto the surface of the PAN at high density. Accordingly, if the amine compound having a podand structure is used, the heavy metal adsorption capacity of the fibrous polymer per unit area may be improved. Although diethylenetriamine (DETA) was used as the amine compound having a podand structure in the test examples described below, the present disclosure is not limited thereto.

When diethylenetriamine (DETA) is reacted with the fibrous polymer consisting of PAN and PMMA as the amine compound having a podand structure, the nitrile groups (—C≡N) on the surface of the PAN are substituted with poly(amidodiethylenediamene) groups (—NH$_2$—NH—NH), which are amine functional groups, and the carbonyl groups (—C=O) on the surface of the PMMA are converted to hydroxyl groups (—OH), as shown in FIG. 1.

Hereinafter, a method for preparing a self-regenerable fibrous adsorbent for heavy metal adsorption according to an exemplary embodiment of the present disclosure will be described.

First, a PAN-PMMA mixture solution wherein a PAN polymer and a PMMA polymer are dissolved is prepared. The PAN-PMMA mixture solution may be prepared by mixing the PAN polymer and the PMMA polymer at a predetermined ratio and dissolving them in a solvent.

The carbonyl groups (—C=O) on the surface of the PMMA are converted to hydroxyl groups (—OH) by a reaction with an amine compound, which will be described later. The converted hydroxyl groups (—OH) on the surface of the PMMA desorb the heavy metal crystals that have grown after being adsorbed by the amine functional groups on the surface of nearby PAN. If the mixing ratio of the PMMA is above a certain level, the amine functional groups lower the heavy metal adsorption performance. According to experimental results that will be described later, it is preferred that the PMMA is mixed at 7 wt % or lower based on the weight of the mixture of the PAN and the PMMA. It was confirmed that the heavy metal adsorption rate increases as the mixing ratio of the PMMA is increased up to 7 wt %, but the heavy metal adsorption rate decreases rapidly when the mixing ratio of the PMMA is 10 wt %.

The solvent of the PAN-PMMA mixture solution may be any of diethyl ether, diisopropyl ether, dimethyl sulfoxide, dimethylformamide and acetonitrile.

When preparing the PAN-PMMA mixture solution, the total weight of the PAN and the PMMA may be 5-15 parts by weight based on the solvent, although not being limited thereto.

After the PAN-PMMA mixture solution has been prepared, a fibrous polymer consisting of PAN and PMMA is prepared by wet-spinning or dry-spinning the PAN-PMMA mixture solution. In case of wet spinning, the fibrous polymer may be prepared by spinning the PAN-PMMA mixture solution in a coagulation solution, e.g., an aqueous ethanol solution. In addition, when conducting the wet spinning or dry spinning, the diameter of the fibrous polymer may be controlled by adjusting the spinning speed of the PAN-PMMA mixture solution. Because the diameter of the fibrous polymer affects the heavy metal adsorption performance and desorption performance, it is necessary to adjust the spinning speed. According to experimental results that will be described later, the fibrous polymer exhibits superior heavy metal adsorption performance as the diameter is smaller, and the heavy metal adsorption performance is decreased if the diameter of the fibrous polymer exceeds 1.5 mm.

The fibrous polymer formed from the mixing of the PAN and the PMMA at a specific ratio may be seen as the PMMA mixed in the PAN matrix at a specific ratio.

After the fibrous polymer consisting of PAN and PMMA has been prepared by spinning the PAN-PMMA mixture solution, the self-regenerable fibrous adsorbent for heavy metal adsorption according to the present disclosure is prepared by reacting the fibrous polymer with an amine compound.

As a result of the reaction of the fibrous polymer with the amine compound, the amine functional groups are immobilized on the surface of the PAN of the fibrous polymer, and the hydroxyl groups (—OH) are immobilized on the surface of the PMMA of the fibrous polymer. Specifically, as a result of the reaction between the fibrous polymer and the amine compound, the nitrile groups (—C≡N) on the surface of the PAN are substituted with amine functional groups and the carbonyl groups (—C═O) on the surface of the PMMA are converted to hydroxyl groups (—OH) by hydrolysis. The amine functional groups refer to functional groups having adsorption capacity for heavy metals and include various functional groups including the amine group (—NH$_2$). For example, when diethylenetriamine (DETA) is used as the amine compound, the nitrile groups (—C≡N) on the surface of the PAN are substituted with poly(amidodiethylenediamene) (—NH$_2$—NH—NH).

As the amine compound, a primary or higher amine compound may be used. In an exemplary embodiment, any of ethylenediamine (EDA), diethylenetriamine (DETA), tris (2-aminoethyl)amine, propane-1,3-diamine, methane triamine, 3-(2-aminoethyl)pentane-1,5-diamine, melamine, diaminofurazan, diaminopyridine and diaminopyrimidine or a combination thereof may be used.

Most specifically, an amine compound having a podand structure, which forms a linear structure, may be used. It is because the number of unit functional groups is small and thus the compound can be effectively introduced onto the surface of the PAN at high density. As a result, the heavy metal adsorption capacity per unit area of the fibrous polymer can be improved. For example, diethylenetriamine (DETA) may be used as the amine compound having a podand structure, although not being limited thereto.

During the reaction of the fibrous polymer and the amine compound, a nonmetallic Lewis acid catalyst or a metallic Lewis acid catalyst may be added to improve the substitution efficiency of the amine functional groups and the formation efficiency of the hydroxyl groups (—OH). $BF_3 \cdot 2H_2O$ may be used as the nonmetallic Lewis acid catalyst, and $AlCl_3 \cdot 6H_2O$ may be used as the metallic Lewis acid catalyst.

As a result of the reaction between the fibrous polymer and the amine compound, the so-called self-regenerable fibrous adsorbent for heavy metal adsorption, wherein the amine functional groups are immobilized on the PAN and the hydroxyl groups (—OH) are immobilized on the surface of the PMMA, is prepared. As described earlier, since the PMMA is mixed in the PAN matrix at a specific ratio on the surface of the fibrous polymer, the bonding of the amine functional groups to the heavy metal crystals adsorbed to the amine functional groups of the PAN is affected by the hydroxyl groups (—OH) of the PMMA. As is generally known, since the hydroxyl groups (—OH) lack adsorption capacity for heavy metals, when the heavy metal crystals adsorbed by the amine functional groups of the PAN grow to a predetermined size or larger, they are naturally desorbed from the surface of the fibrous polymer because of decreased bonding force to the PAN matrix owing to the hydroxyl groups (—OH). Based on this principle, the heavy metals can be adsorbed by the amine functional groups and can also be desorbed by the hydroxyl groups (—OH).

The self-regenerable fibrous adsorbent for heavy metal adsorption according to the present disclosure, which consists of the PAN on which the amine functional groups are immobilized and the PMMA on which the hydroxyl groups (—OH) are immobilized, allows heavy metals to be adsorbed by the amine functional groups provided on the PAN and heavy metal crystals to be desorbed by hydroxyl groups (—OH) provided on the PMMA. The material composition can be extended as long as this principle is satisfied.

That is to say, the self-regenerable fibrous adsorbent for heavy metal adsorption may consist of a first polymer material having heavy metal-adsorbing functional groups and a second polymer material having heavy metal crystal-desorbing functional groups. The heavy metal-adsorbing functional groups of the first polymer material are amine functional groups, and the heavy metal crystal-desorbing functional groups of the second polymer material are any of methyl groups, carbonyl groups, carboxyl groups and phosphate groups in addition to hydroxyl groups (—OH). In addition to the heavy metal-adsorbing functional groups described above, functional groups lacking adsorption capacity for heavy metal ions in water may also be used as the heavy metal-adsorbing functional group.

Furthermore, the first polymer material having amine functional groups may be any of polyisopropylacrylamide, polyaryleneamine, poly(glycidyl methacrylate) and polyacrylonitrile, and the second polymer material having heavy metal crystal-desorbing functional groups may be any of polychloroprene, polyisoprene, polyisobutylene, polybutadiene, SBS rubber, polyamide, natural polymer, initial synthetic polymer, polypropylene, polyvinyl chloride, polyethylene, polystyrene, nylon, polyester and phenol resin. In addition to the materials described above, a material that can chemically immobilize amine functional groups may be used as the first polymer material, and a material that can immobilize any of hydroxyl groups (—OH), methyl groups, carbonyl groups, carboxyl groups and phosphate groups or a material that can immobilize functional groups lacking adsorption capacity for heavy metal ions in water may be used as the second polymer material.

As in the self-regenerable fibrous adsorbent for heavy metal adsorption consisting of PAN and PMMA, a fibrous polymer consisting of a first polymer material and a second polymer material is prepared by spinning a mixture solution of the first polymer material and the second polymer material, and then the fibrous polymer is reacted with an amine compound to immobilize amine functional groups on the first polymer material and immobilize heavy metal crystal-desorbing functional groups on the second polymer material. Unlike hydroxyl groups (—OH) formed by hydrolysis, methyl groups, carbonyl groups, carboxyl groups, phosphate groups, etc. are the functional groups present intrinsically on the second polymer material and they are immobilized on the surface of the second polymer material upon reaction of the fibrous polymer and the amine compound without a hydrolysis process.

In the self-regenerable fibrous adsorbent for heavy metal adsorption consisting of the first polymer material and the second polymer material, heavy metal ions in water are adsorbed by the amine functional groups provided on the surface of the first polymer material and grow into crystals, and the grown heavy metal crystals are desorbed by any of methyl groups, carbonyl groups, carboxyl groups and phosphate groups, which are the heavy metal crystal-desorbing functional group provided on the second polymer material. The first polymer material having the amine functional groups and the second polymer material having the heavy metal crystal-desorbing functional groups serve the same functions as the PAN having the amine functional groups and the PMMA having the hydroxyl groups (—OH), respectively.

The self-regenerable fibrous adsorbent for heavy metal adsorption according to an exemplary embodiment of the present disclosure and a method for preparing the same have been described above. Hereinafter, the present disclosure will be described more specifically through experimental examples.

Experimental Example 1: Preparation of Self-Regenerable Fibrous Adsorbents for Heavy Metal Adsorption After mixing 0 g (SRF0), 1 g (SRF1), 3 g (SRF3), 5 g (SRF5), 7 g (SRF7) or 10 g (SRF10) of PMMA with PAN so that the total weight was 10 g, the mixture was dissolved in 90 g of DMF. Then, a fibrous polymer was obtained by spinning the DMF solution wherein PAN and PMMA are dissolved in an aqueous ethanol solution, keeping at room temperature for 1 hour and then washing with water.

After injecting 15 g of each of the prepared fibrous polymer to 100 g of diethylenetriamine (DETA), 1.5 g of $AlCl_3 \cdot 6H_2O$ was added while heating at 120° C. Then, self-regenerable fibrous adsorbents for heavy metal adsorption (SRF0, SRF1, SRF3, SRF5, SRF7 and SRF10) were prepared by leaving alone for 1 hour and then washing with water. 'SRF' stands for self-regenerable fiber.

Figure 3:
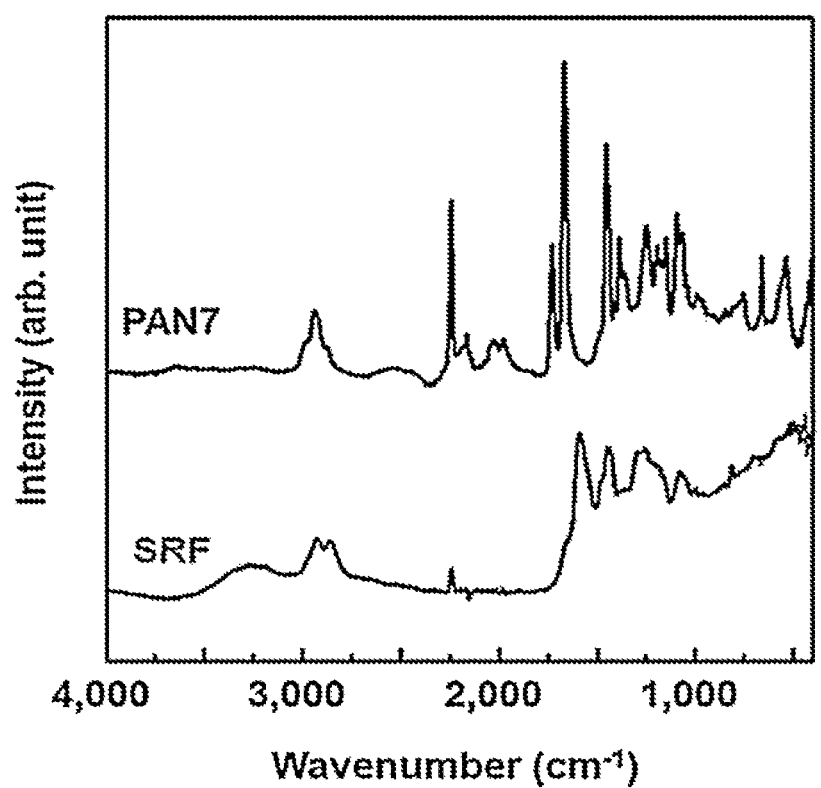
FIG. 3 shows the FT-IR analysis result of a self-regenerable fibrous adsorbent for heavy metal adsorption prepared in Experimental Example 1.

Experimental Example 2: Characterization of Self-Regenerable Fibrous Adsorbents for Heavy Metal Adsorption As a result of conducting FT-IR analysis for the self-regenerable fibrous adsorbent for heavy metal adsorption wherein 7 wt % of PMMA is mixed (SRF7), prepared in Experimental Example 1 (see FIG. 3), it was observed that the peak of the nitrile group (—C≡N) (2240 cm$^{-1}$), which is the main functional group of PAN, was disappeared by the amine modification and the peaks corresponding to the introduced diethylenetriamine functional groups (3346, 1590, 1573 and 1485 cm$^{-1}$) appeared. This confirms that surface modification occurred successfully. In addition, it was confirmed that the peak of the C=O group of PMMA at about 1750 cm$^{-1}$ disappeared and the peak of the —OH functional group at 3300 cm$^{-1}$ occurred after the reaction.

Figure 4:
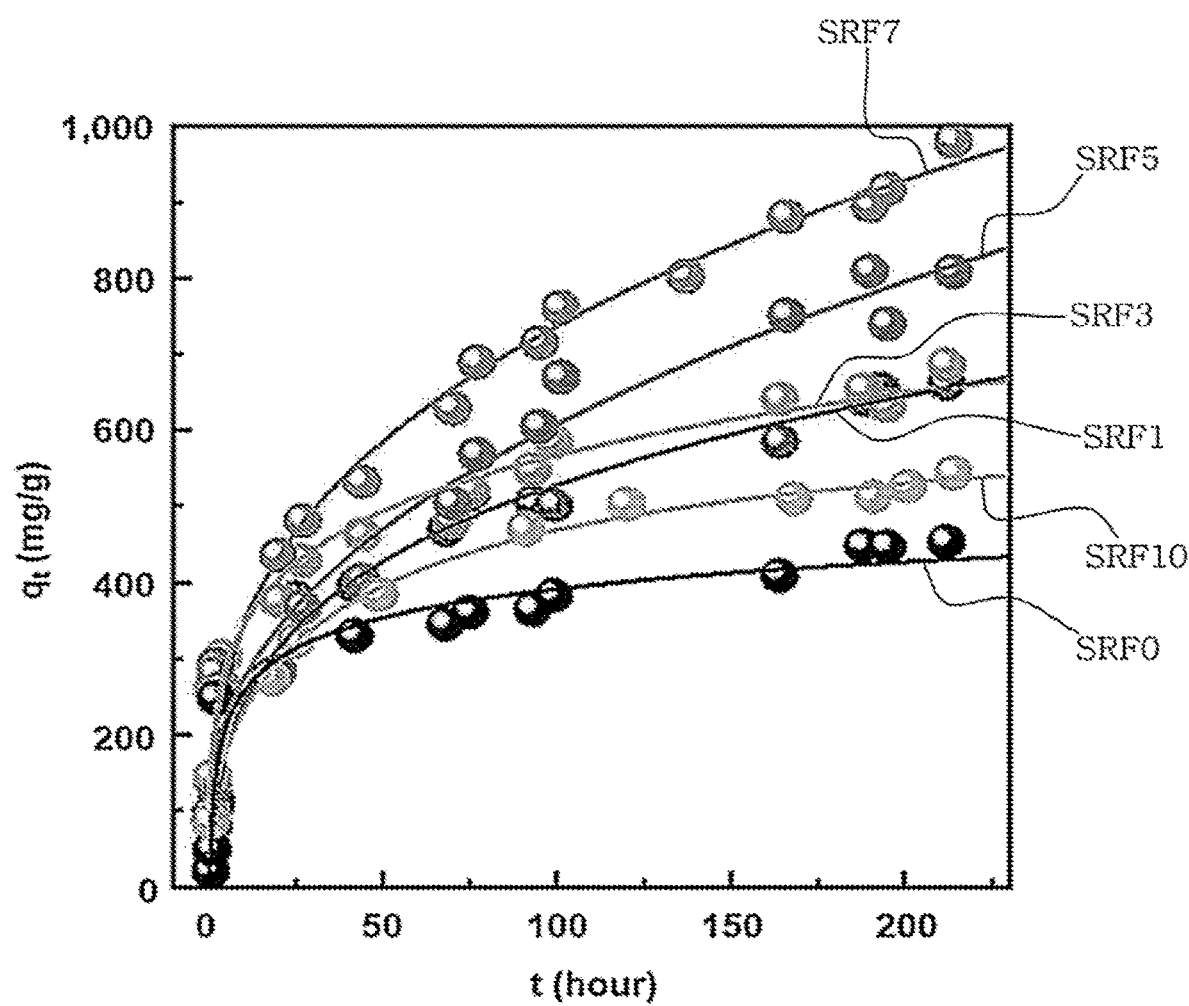
FIG. 4 shows the copper adsorption characteristics of SRF0, SRF1, SRF3, SRF5, SRF7 and SRF10 prepared in Experimental Example 1 depending on time.
Figure 5:
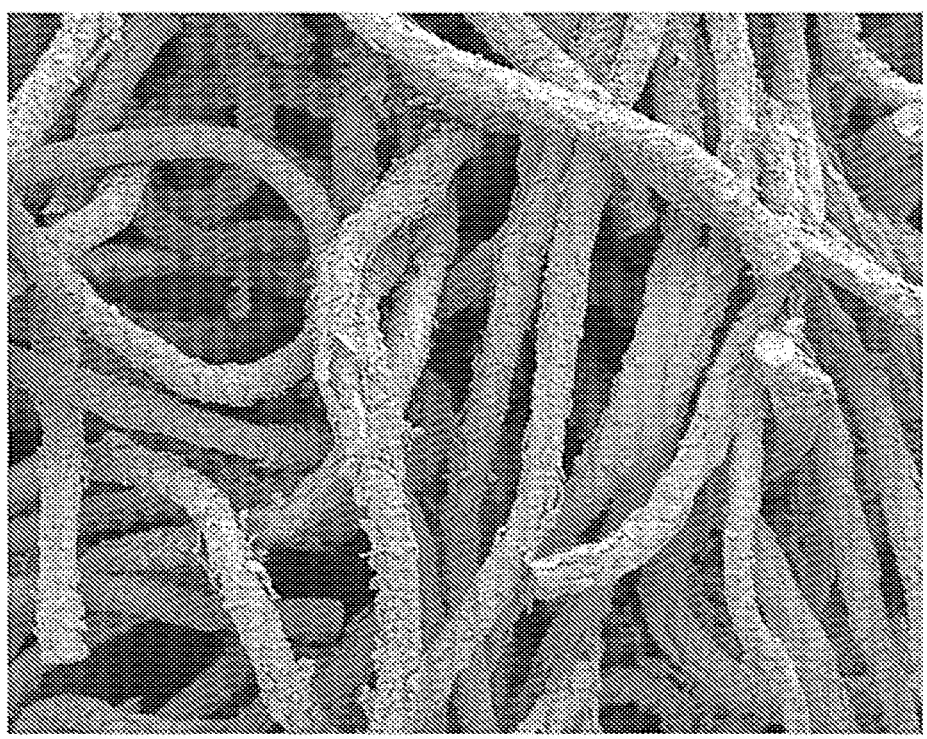
FIG. 5 shows the SEM image of SRF0 after the experiment of FIG. 4 has been completed.

After adding each of SRF0, SRF1, SRF3, SRF5, SRF7 and SRF10 prepared in Experimental Example 1 to an aqueous solution of copper (Cu), the solution was observed for 10 days (see FIG. 4). As a result, all the fibrous adsorbents showed increase in copper adsorption amount (qt) depending on time except for SRF0. Among them, SRF7 (PMMA 7 wt %) showed the best adsorption capacity. In contrast, SRF0 containing no PMMA showed insignificant increase in copper adsorption amount with time. This result is also confirmed by the SEM image of FIG. 5.

Figure 7A:
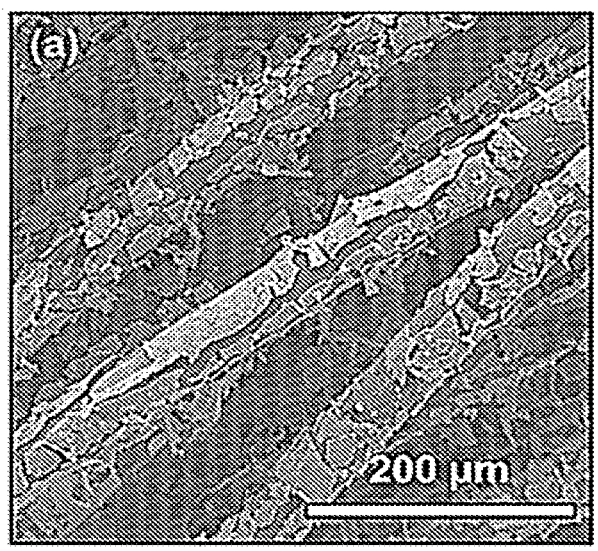
FIG. 7A to FIG. 7F show the SEM images of self-regenerable fibrous adsorbents after the experiment of FIG. 6 has been completed.
Figure 7B:
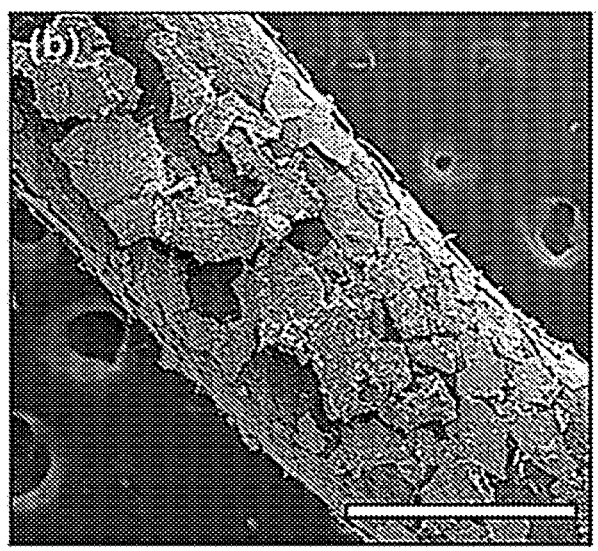
Figure 7C:
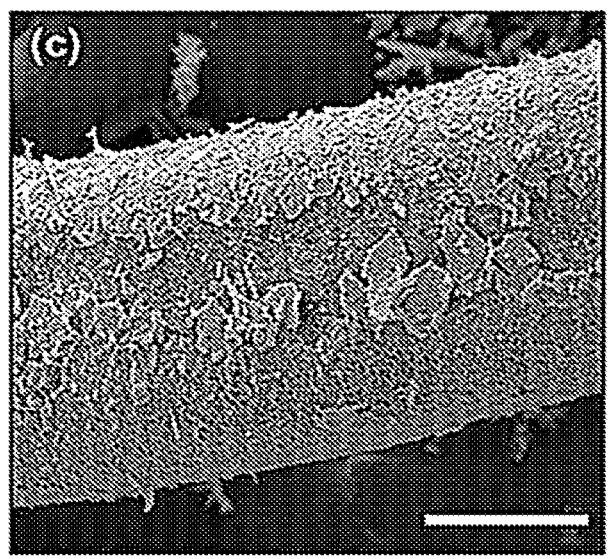
Figure 7D:
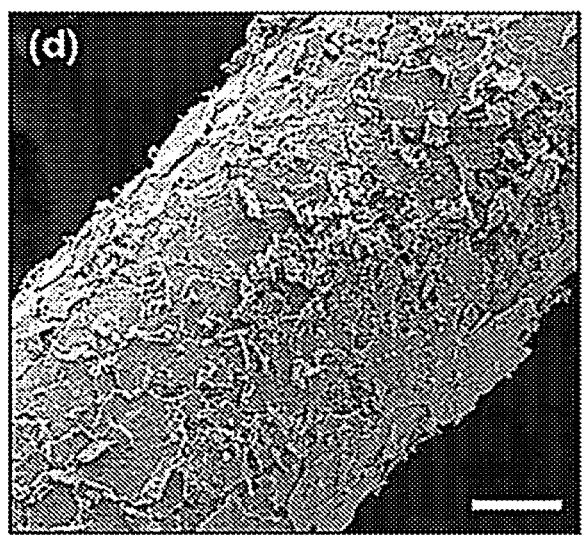
Figure 7E:
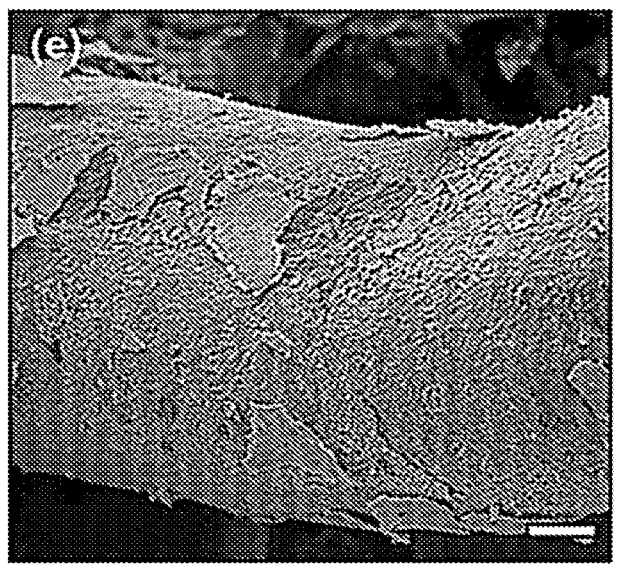
Figure 7F:
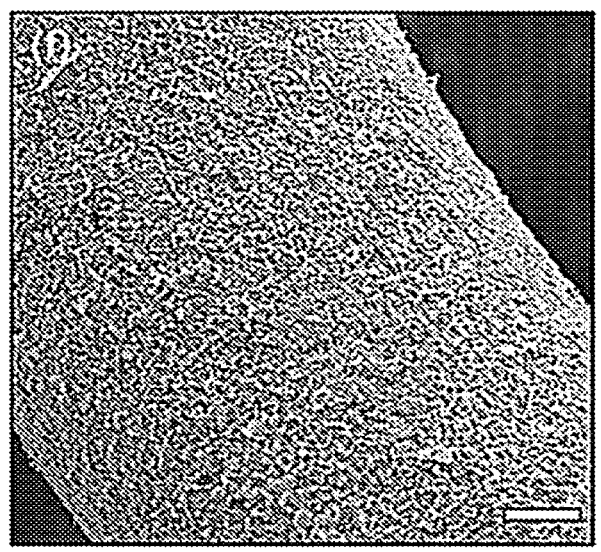

SRF7 fibrous polymers were prepared as in Experimental Example 1 with different diameters of 0.045 (SRF7/45), 0.240 (SRF7/240), 0.40 (SRF7/450), 0.870 (SRF7/870), 1.310 (SRF7/1310) and 1.500 (SRF7/1500) mm, and their ability of removing copper ions was investigated with time. As shown in FIG. 6, the copper adsorption amount was increased with time as the diameter of the fibrous polymer was smaller. SRF7/1500 with the largest diameter of 1.5 mm showed little change in the copper adsorption amount with time. This result means that, whereas the fibrous polymer with a relatively small diameter shows good copper adsorption performance due to continuous desorption of the adsorbed copper crystals, the fibrous polymer with a large diameter does not show adsorption capacity for copper ions after the copper ions have been adsorbed to a certain level because the copper crystals are not desorbed. This result is also confirmed in FIG. 7A to FIG. 7F. FIG. 7A to FIG. 7F show the images of the fibrous adsorbents 10 days after the experiment of FIG. 6. It can be seen that, whereas copper crystals remain on the surface of the fibrous adsorbent without desorption for SRF7/1500 having the largest diameter (FIG. 7 (f)), the copper crystals are desorbed from the surface of the fibrous polymer for the fibrous polymers with smaller diameters. FIG. 7 shows the SEM images of SRF7/45 (FIG. 7A), SRF7/240 (FIG. 7B), SRF7/450 (FIG. 7C), SRF7/870 (FIG. 7D), SRF7/1310 (FIG. 7E) and SRF7/1500 (FIG. 7F).

Figure 8A:
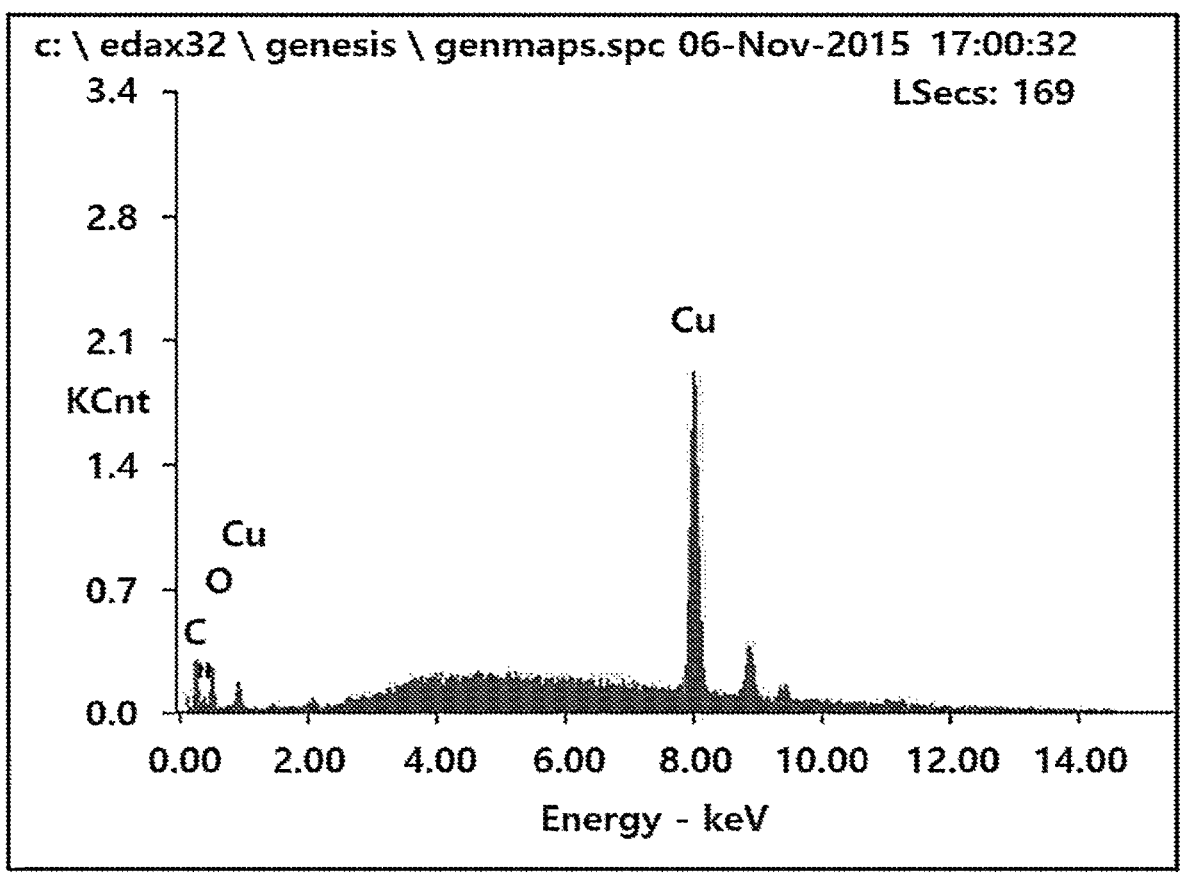
Figure 8C:
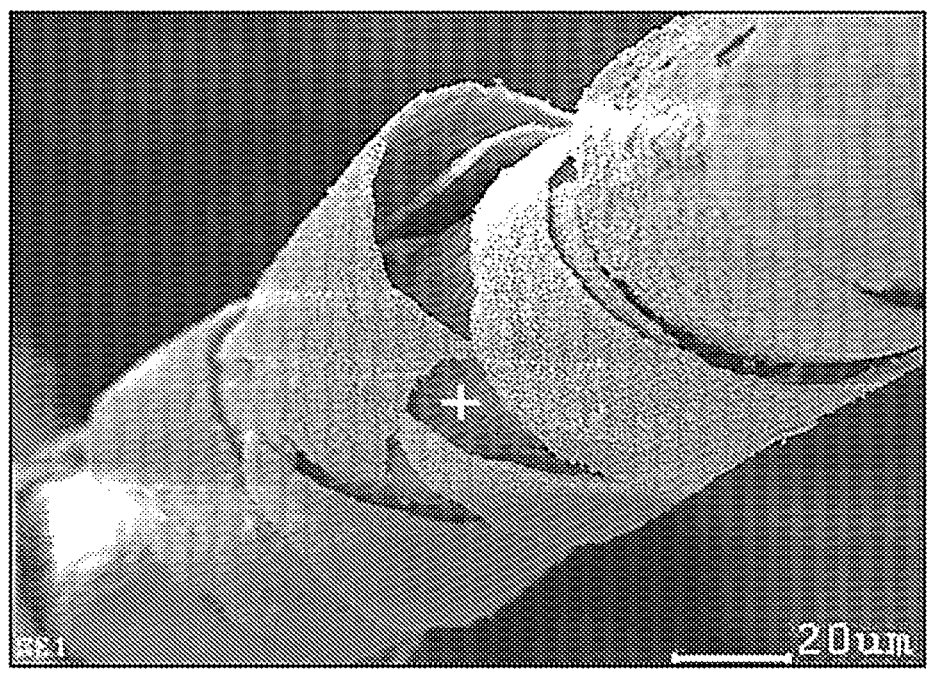

The desorption of the adsorbed copper crystals and the growth of new copper crystals at the desorption site are also confirmed from the SEM and EDS analysis results of SRF7/45 (FIG. 8A to FIG. 8C). The presence of copper crystals at the site where the copper crystals have been desorbed was confirmed from the EDS analysis result for SRF7/45.

Figure 9:
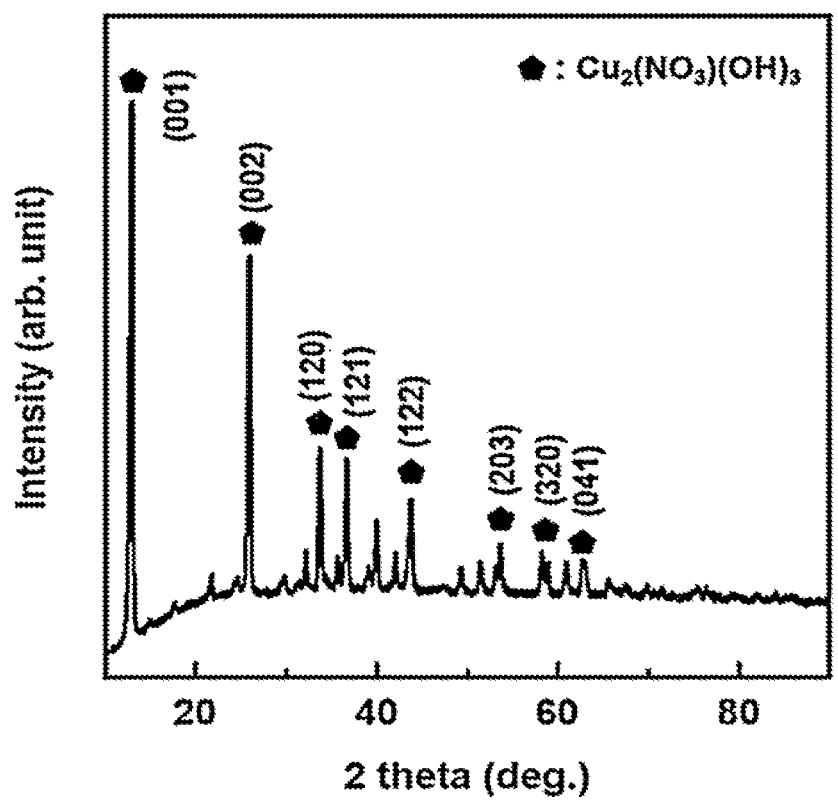
FIG. 9 shows the XRD analysis result for crystals grown on the surface of a self-regenerable fibrous adsorbent.
Figure 10:
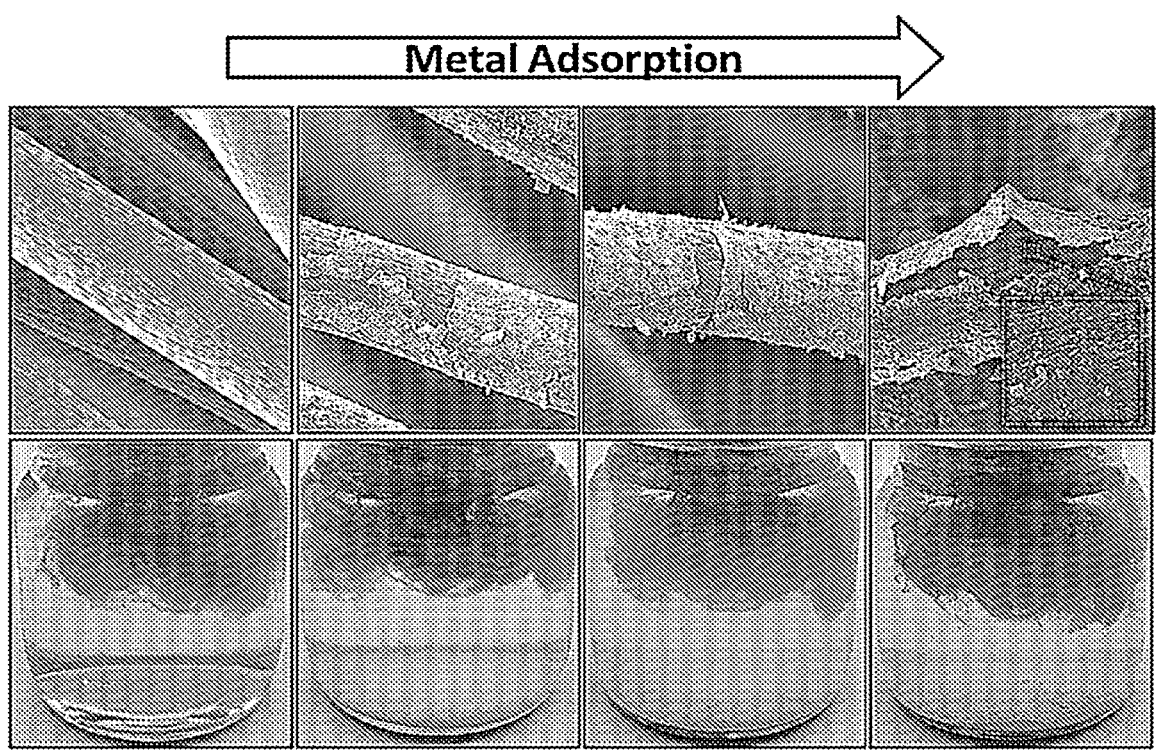
FIG. 10 shows the SEM and photographic images showing the process whereby copper ions grow into copper crystals and then desorbed.

Meanwhile, as a result of conducting XRD analysis for the crystals grown on the surface of SRF7/45, it was confirmed that the crystals originated from the binding of copper ions and anions in water (see FIG. 9). As a result of conducting SEM analysis and visual inspection during the growth of copper ions into copper crystals and desorption thereof, it was confirmed that the copper crystals are desorbed from the surface of the fibrous adsorbent and sink at the bottom of the reaction tank (see FIG. 10).

Figure 11A:
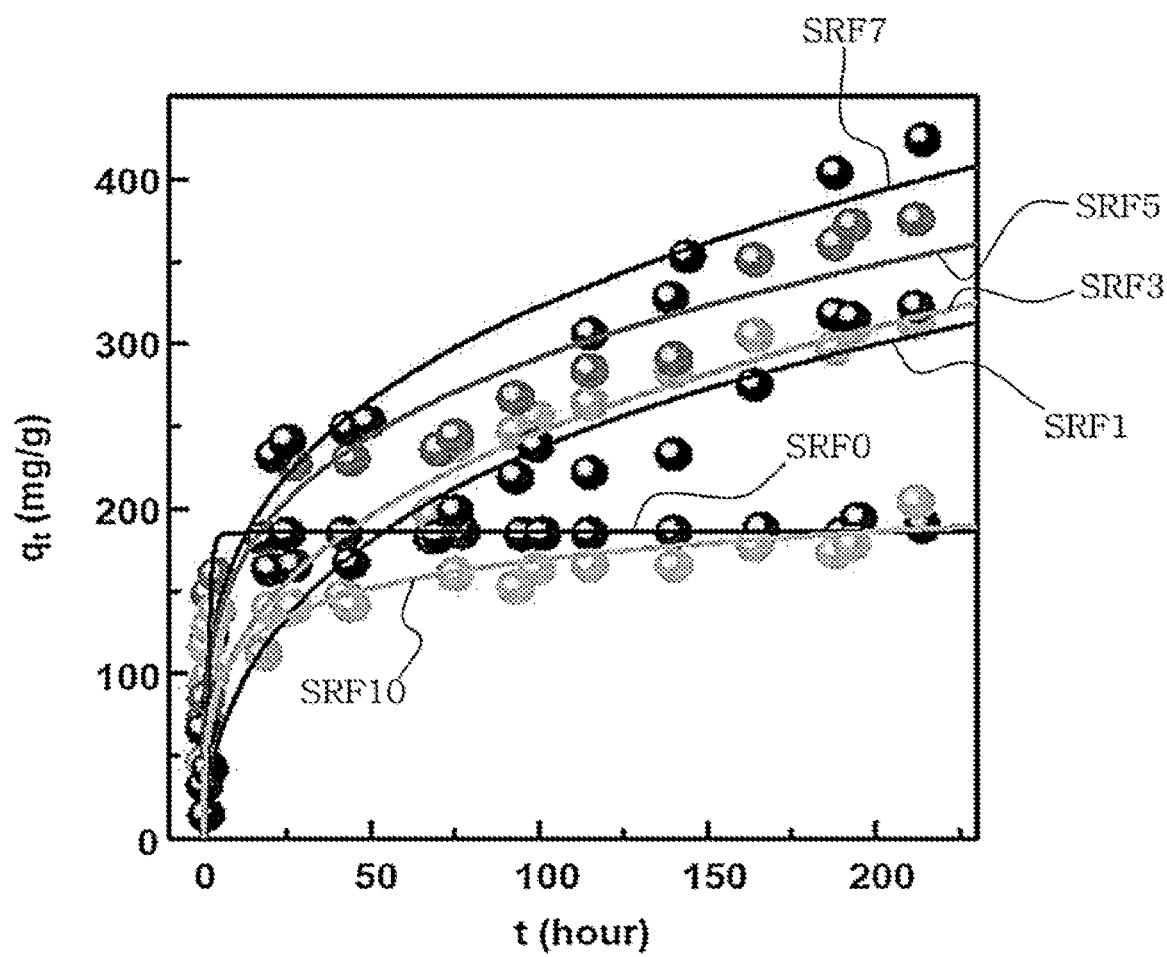
FIG. 11A and FIG. 11B show the adsorption characteristics of self-regenerable fibrous adsorbents prepared in Experimental Example 1 for nickel ions depending on time.
Figure 11B:
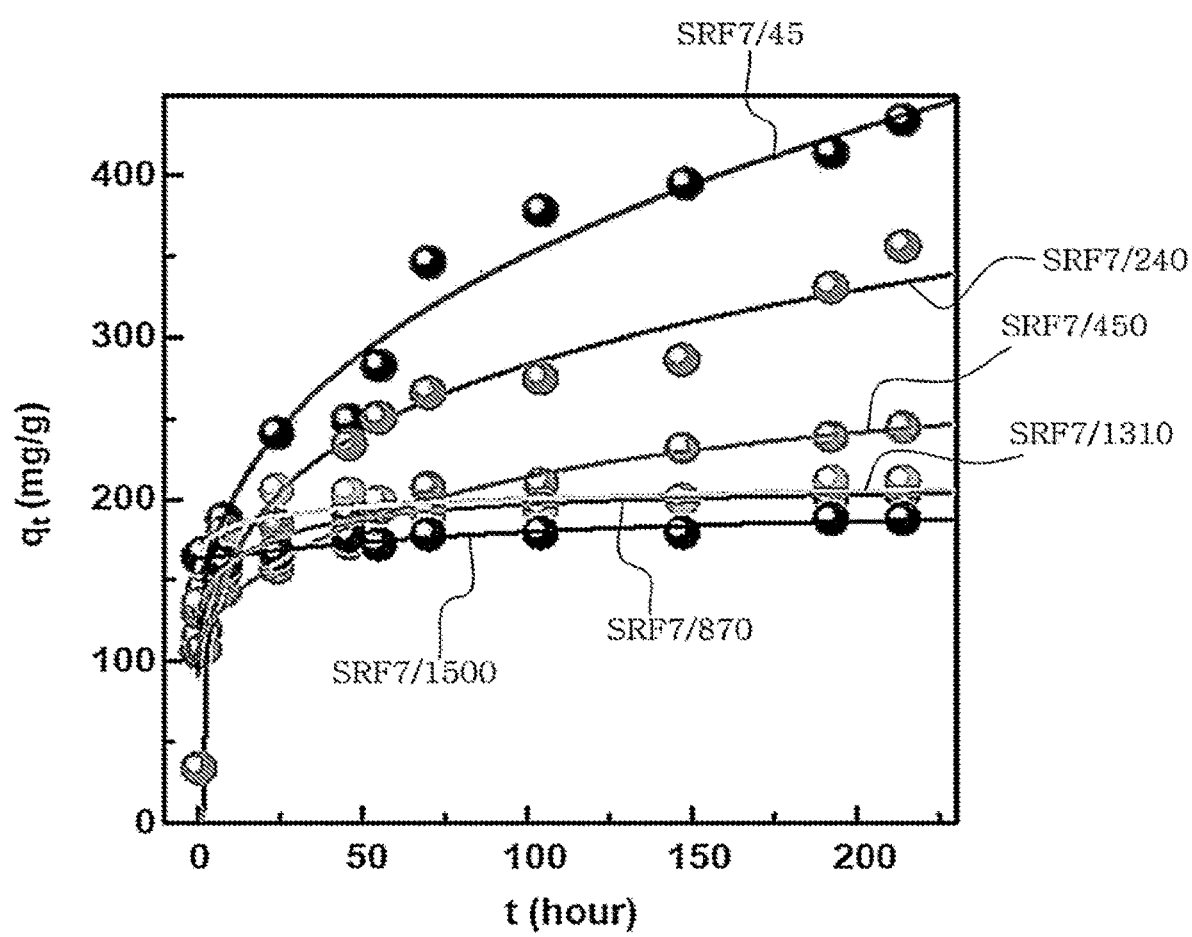

The nickel ion-removing ability of the fibrous adsorbents prepared in Experimental Example 1 (SRF0, SRF1, SRF3, SRF5, SRF7 and SRF10) was investigated. As a result, SRF7 showed the best adsorption performance as shown in FIG. 11A. In addition, in the nickel ion removal experiment using SRF7/45, SRF7/240, SRF7/450, SRF7/870, SRF7/1310 and SRF7/1500 having different diameters, a similar tendency was observed as in the experiment for copper ions (see FIG. 11B).

Figure 12:
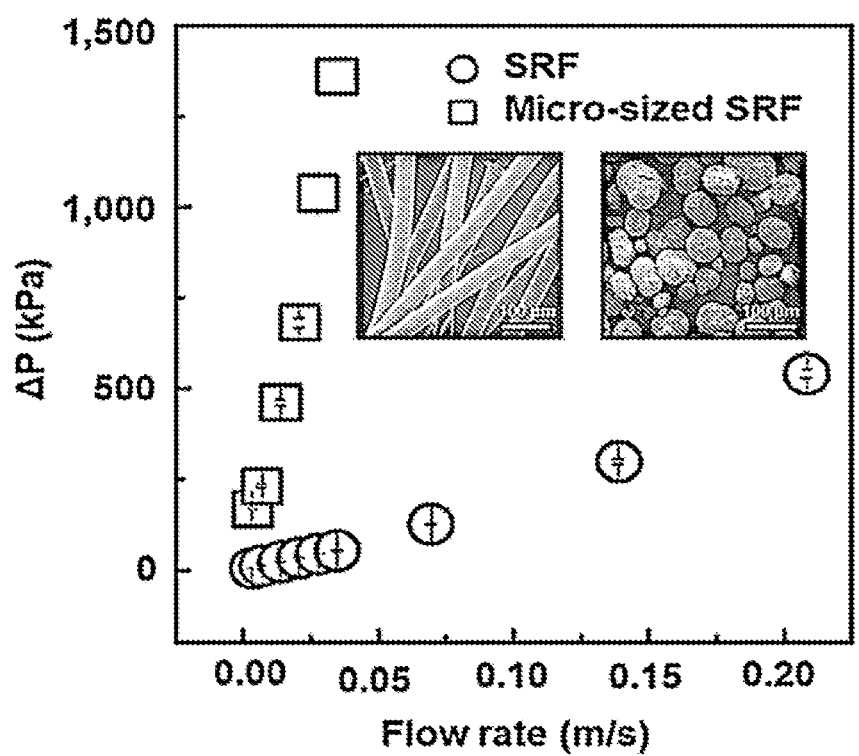
FIG. 12 shows the pressure drop characteristics of self-regenerable fibrous adsorbent prepared in Experimental Example 1.

Pressure drop characteristics depending on flow rate were investigated for the fibrous SRF7 prepared in Experimental Example 1 and micrometer-sized particulate SRF7 after packing in different columns. As shown in FIG. 12, the column packed with the fibrous SRF7 showed significantly smaller pressure drop as compared to the column packed with the particulate SRF7.

What is claimed is:

1. A self-regenerable fibrous adsorbent for heavy metal adsorption, which is a fibrous polymer consisting of a first polymer material and a second polymer material, wherein
heavy metal-adsorbing functional groups are immobilized on the surface of the first polymer material and heavy metal crystal-desorbing functional groups are immobilized on the surface of the second polymer material, and heavy metal ions in water are adsorbed by the heavy metal-adsorbing functional groups of the first polymer material and grow into crystals, and the heavy metal crystals are desorbed by the heavy metal crystal-desorbing functional groups of the second polymer material when they grow to a predetermined size or larger.

2. The self-regenerable fibrous adsorbent for heavy metal adsorption according to claim 1, wherein the heavy metal-adsorbing functional group is an amine functional group, and the heavy metal crystal-desorbing functional group is any of a hydroxyl group, a methyl group, a carbonyl group, a carboxyl group and a phosphate group.

3. The self-regenerable fibrous adsorbent for heavy metal adsorption according to claim 1, wherein the first polymer material is a material that can immobilize amine functional groups, and the second polymer material is a material that cannot adsorb heavy metal ions in water.

4. The self-regenerable fibrous adsorbent for heavy metal adsorption according to claim 1, wherein the first polymer material is any of polyisopropylacrylamide, polyaryleneamine, poly(glycidyl methacrylate) and polyacrylonitrile.

5. The self-regenerable fibrous adsorbent for heavy metal adsorption according to claim 1, wherein the second polymer material is any of polychloroprene, polyisoprene, polyisobutylene, polybutadiene, SBS rubber, polyamide, a natural polymer, an initial synthetic polymer, polypropylene, polyvinyl chloride, polyethylene, polystyrene, nylon, polyester and phenol resin.

6. A self-regenerable fibrous adsorbent for heavy metal adsorption, which is a fibrous polymer consisting of PAN and PMMA, wherein amine functional groups are immobilized on the surface of the PAN and hydroxyl groups (—OH) are immobilized on the surface of the PMMA.

7. The self-regenerable fibrous adsorbent for heavy metal adsorption according to claim 6, wherein heavy metal ions in water are adsorbed by the amine functional group of the PAN and grow into crystals, and the heavy metal crystals are desorbed by the hydroxyl groups (—OH) of the PMMA when they grow to a predetermined size or larger.

8. The self-regenerable fibrous adsorbent for heavy metal adsorption according to claim 6, wherein the amine functional groups are formed from substitution of the nitrile groups (—C≡N) of the PAN, and the hydroxyl groups (—OH) are formed from hydrolysis of the carbonyl groups (—C=O) of the PMMA.

9. The self-regenerable fibrous adsorbent for heavy metal adsorption according to claim 6, wherein the fibrous polymer comprises 7 wt % or less of PMMA based on the total weight of the fibrous polymer.

10. The self-regenerable fibrous adsorbent for heavy metal adsorption according to claim 6, wherein the fibrous polymer has a diameter of smaller than 1.5 mm.

11. The self-regenerable fibrous adsorbent for heavy metal adsorption according to claim 6, wherein the amine functional group is a functional group comprising an amine group (—NH$_2$) that can adsorb heavy metal ions.

\* \* \* \* \*